United States Patent
Ouyang et al.

(10) Patent No.: US 9,119,086 B1
(45) Date of Patent: Aug. 25, 2015

(54) EVALUATING 3G AND VOICE OVER LONG TERM EVOLUTION VOICE QUALITY

(71) Applicant: CELLCO PARTNERSHIP, Basking Ridge, NJ (US)

(72) Inventors: Ye Ouyang, Basking Ridge, NJ (US); Carol Becht, Boonton, NJ (US); Benjamin Lowe, Short Hills, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 0 days.

(21) Appl. No.: 14/273,433

(22) Filed: May 8, 2014

(51) Int. Cl.
*H04W 24/08* (2009.01)
*H04W 24/02* (2009.01)
*H04W 24/10* (2009.01)

(52) U.S. Cl.
CPC ............. *H04W 24/02* (2013.01); *H04W 24/10* (2013.01)

(58) Field of Classification Search
CPC ............................. H04W 24/08; H04W 28/021
USPC ......... 455/423, 424, 67.11, 67.13, 135, 161.3
See application file for complete search history.

(56) References Cited

U.S. PATENT DOCUMENTS

| | | | |
|---|---|---|---|
| 8,301,149 B2 * | 10/2012 | del Rio Romero et al. | 455/443 |
| 8,775,332 B1 * | 7/2014 | Morris et al. | 706/11 |
| 8,811,977 B2 * | 8/2014 | Austin et al. | 455/423 |
| 2008/0082329 A1 * | 4/2008 | Watson | 704/235 |
| 2008/0082330 A1 * | 4/2008 | Blair | 704/235 |
| 2015/0024735 A1 * | 1/2015 | Ibbotson et al. | 455/423 |
| 2015/0119020 A1 * | 4/2015 | Henderson et al. | 455/423 |

OTHER PUBLICATIONS

ITU-T, P.863, Telecommunication Standardization Sector of ITU, Perceptual Objective Listening Quality Assessment (2011).
ITU-T, P.863, Amendment 1: New Appendix III—Prediction of Acoustically Recorded Narrowband Speech (2011).
Implementer's Guide I for Recommendation ITU-T, P.863: Mapping Function of P.863 Results into MOS-LQO, pp. 1-9, (2011).
Implementer's Guide II for Recommendation ITU-T, P.863: Bug Fixes, pp. 1-5 (Nov. 2011).

* cited by examiner

*Primary Examiner* — Cong Tran (57) ABSTRACT

Systems and methods for evaluating cellular voice call quality are disclosed. In some implementations, training data points are received. Each data point includes a call quality value and values of key performance indicators (KPIs) related to call quality. For each KPI, a linear relationship, having a goodness-of-fit value, between the KPI and the call quality value is determined using the multiple data points. Compulsory KPIs are selected based on the goodness-of-fit values. The training data points are separated into clusters based on the compulsory KPI values and the quality values. For each cluster, a mathematical relationship for calculating the call quality within the cluster is determined based on the one or more compulsory KPIs. A module is generated for predicting the call quality value by combining the determined mathematical relationships.

20 Claims, 8 Drawing Sheets

EVALUATING 3G AND VOICE OVER LONG TERM EVOLUTION VOICE QUALITY

BACKGROUND

One factor that customers take into account when selecting a cellular operator is the quality of cellular voice calls. Customers may be willing to pay higher monthly premiums or consume fewer voice, text, or data resources in order to experience higher quality cellular voice calls. Thus, a cellular operator may invest money to purchase resources (e.g., cellular towers and equipment placed thereon) that improve voice call quality on its network. Determining which resources to purchase may be difficult due to challenges in measuring voice call quality and challenges in selecting the resources which are most likely to improve voice call quality per dollar spent. As the foregoing illustrates, new approaches for evaluating cellular voice call quality may be desirable.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The subject technology provides techniques for evaluating cellular voice call quality. Cellular voice call quality may be measured using a Perceptual Objective Listening Quality Assessment (POLQA) score, also known as ITU-T Rec. P.863. Some implementations of the subject technology are directed toward techniques for calculating the POLQA score or another measure of cellular voice call quality.

According to some aspects of the subject technology, a computing device receives multiple training data points. Each data point in the multiple training data points includes a cellular voice call quality value and values for at least a subset of a set of key performance indicators (KPIs) related to a cellular voice call quality. The cellular voice call quality value may be a POLQA score or another measure of cellular voice call quality. The multiple data points may include measured data points from a Long Term Evolution (LTE) cellular network or any other cellular network or data points measured from a mobile device capable of making voice calls. Exemplary KPIs which may be included in the set of KPIs are illustrated in Table 1 and Table 2, with Table 1 including KPIs measured from an audio sample generated in a LTE network and Table 2 including KPIs measured from a mobile device in a LTE network. Linear correlations to the cellular voice call quality, according to one study, are also listed. However, in other studies, different correlations with the cellular voice call quality may be found.

TABLE 1

KPIs Measured From Audio Sample.

| KPI | Correlation to Voice Call Quality |
|---|---|
| Audio.Rx.Delta.Delay..ms. | Weak Correlation |
| Audio.Rx.Interarrival.Packet.Delay | Strong Correlation |
| Audio.Rx.Interarrival.Packet.Delta.Delay | Strong Correlation |
| Audio.Rx.Interarrival.Packet.Jitter | Weak Correlation |
| Audio.Rx.Jitter..ms. | Weak Correlation |
| Audio.Rx.Packet.Count | Strong Correlation |
| Audio.Rx.Packet.Loss.... | Strong Correlation |
| Audio.Rx.Packet.Loss.Count | Strong Correlation |
| Audio.Rx.Received.Packet..Byte. | Strong Correlation |
| Audio.Rx.Throughput..kbps. | Strong Correlation |
| Audio.Rx.Tx.Codec.Delay | Strong Correlation |
| Audio.Rx.OPERATOR.Jitter.Delay....ms. | Weak Correlation |
| Audio.Tx.Packet.Count | Near No Correlation |
| Audio.Tx.Packet.Loss.... | Near No Correlation |
| Audio.Tx.Packet.Loss.Count | Near No Correlation |
| Audio.Tx.Throughput..kbps. | Near No Correlation |
| Audio.Tx.Transmitted.Packet..Byte. | Near No Correlation |

TABLE 2

KPIs Measured From Mobile Device.

| KPI | Correlation to Voice Call Quality |
|---|---|
| Handover.Happening | Strong Correlation |
| LTE.KPI.MAC.DL.Throughput.Mbps. | Strong Correlation |
| LTE.KPI.MAC.UL.Throughput.Mbps. | Weak Correlation |
| LTE.KPI.PDCP.DL.Throughput.Mbps. | Strong Correlation |
| LTE.KPI.PDCP.UL.Throughput.Mbps. | Near No Correlation |
| LTE.KPI.PDSCH.BLER... | Weak Correlation |
| LTE.KPI.PDSCH.PRB.Number | Weak Correlation |
| LTE.KPI.PDSCH.Throughput.Mbps. | Weak Correlation |
| LTE.KPI.PUCCH.Power.dBm. | Weak Correlation |
| LTE.KPI.PUCCH.Power.mW. | Weak Correlation |
| LTE.KPI.PUSCH.BLER... | Near No Correlation |
| LTE.KPI.PUSCH.Power.dBm. | Near No Correlation |
| LTE.KPI.PUSCH.Power.mW. | Near No Correlation |
| LTE.KPI.PUSCH.PRB.Number | Weak Correlation |
| LTE.KPI.PUSCH.Throughput.Mbps. | Weak Correlation |
| LTE.KPI.RLC.DL.Throughput.Mbps. | Strong Correlation |
| LTE.KPI.RLC.UL.Throughput.Mbps. | Weak Correlation |
| LTE.KPI.Serving.RSRP.dBm. | Near No Correlation |
| LTE.KPI.Serving.RSRP.mW. | Near No Correlation |
| LTE.KPI.Serving.RSRQ.dB. | Near No Correlation |
| LTE.KPI.Serving.RSRQ.W. | Near No Correlation |
| LTE.KPI.Serving.RSSI.dBm. | Near No Correlation |
| LTE.KPI.Serving.RSSI.mW. | Near No Correlation |
| LTE.KPI.SINR.dB. | Near No Correlation |
| LTE.KPI.SINR.W. | Near No Correlation |

TABLE 2-continued

KPIs Measured From Mobile Device.

| KPI | Correlation to Voice Call Quality |
|---|---|
| LTE.KPI.SRS.Power.dBm. | Near No Correlation |
| LTE.KPI.SRS.Power.mW. | Near No Correlation |
| LTE.KPI.Total.Tx.Power.dBm. | Strong Correlation |
| LTE.KPI.Total.Tx.Power.mW. | Strong Correlation |

In some cases, the cellular voice call quality value may be calculated by comparing a local recording of a speaker speaking into a local microphone and a remote recording of the speaker speaking over a cellular connection. The local microphone may be proximate (e.g., within 1 meter or within 5 meters) to a speaker, while the remote recording may be made using a cellular phone call to a destination at which the speaker cannot be heard without the aid of telephone technology. The remote recording may be made, for example, 1 kilometer, 100 kilometers, or 1000 kilometers away from the speaker. The recordings may be played to various test subjects, and the test subject may provide an opinion score as to how "good" and "understandable" the remote recording is, relative to the local recording. For example, the test subject may be asked to rank the goodness or understandability of the remote speaker on a scale of 0 through 10, with 0 representing "I cannot understand the remote speaker at all," and 10 representing "I can understand the speaker as though he/she were standing right next to me." A Mean Opinion Score (MOS) of the opinion scores by the tests subjects may be calculated, for example, based on a mean of the 0 through 10 rankings described above.

The computing device determines, for each KPI in the set of KPIs and using the multiple training data points, a linear relationship between the KPI and the cellular voice call quality value. The linear relationship may be determined using linear regression techniques for estimating a best-fit line through a set of points. Several software products, for example, MATLAB®, developed by MathWorks Corporation in Natick, Mass., or SAS/STAT®, developed by SAS Institute Inc. in Cary, N.C., are configured to implement linear regression techniques. The multiple training data points are a set of measured data points of KPI(s) and cellular voice call quality values from an existing cellular network, for example, the cellular network of a specified cellular operator in the United States. Each training data point may include cellular voice call quality value and values for at least a subset of a set of KPIs related to a cellular voice call quality. Each linear relationship is associated with a goodness of fit value. The goodness of fit value measures how well a function estimates values that the function is designed to compute. A "good" goodness of fit indicates that the function accurately estimates values that the function is designed to compute, while a "bad" goodness of fit value indicates that the function does not accurately estimate values that the function is designed to compute. The goodness of fit value may be determined using statistical techniques, for example, a regression analysis technique or a chi-squared technique. One or more compulsory KPIs may be selected based on the goodness of fit. The compulsory KPI(s) may have a goodness of fit value that indicates a better fit (e.g., is greater or less than a threshold. In some cases, a predetermined number (e.g., two or three) of KPIs having the best fit goodness of fit value may be selected to be the compulsory KPIs. Exemplary techniques for selecting the compulsory KPI(s) are described herein in conjunction with FIG. 4.

According to the regression analysis technique, the goodness of fit value ($\chi^2$) is calculated according to Equation 1.

$$\chi^2 = \sum \frac{(O-E)^2}{\sigma^2} \qquad \text{Equation 1}$$

In Equation 1, O represents an observed value (e.g., of cellular voice call quality), E represents an expected value (e.g., value on the calculated linear relationship between the KPI and the cellular voice call quality value) corresponding to the observed value, and σ represents the standard deviation in the difference between observed and expected values. The summation is taken over all observed values O.

According to the chi-squared technique, the goodness of fit value ($\chi^2$) is calculated according to Equation 2.

$$\chi^2 = \sum_{i=1}^{n} \frac{(O_i - E_i)^2}{E_i} \qquad \text{Equation 2}$$

In Equation 2, there are n observed values, $O_i$ represents an observed value (e.g., of cellular voice call quality), and $E_i$ represents an expected value corresponding to the observed value.

The multiple training data points may be separated into two or more clusters based on the compulsory KPI(s) and the cellular voice call quality values. Exemplary techniques for separating the multiple training data points into clusters and analyzing the clusters are described herein in conjunction with FIG. 4.

Figure 1:
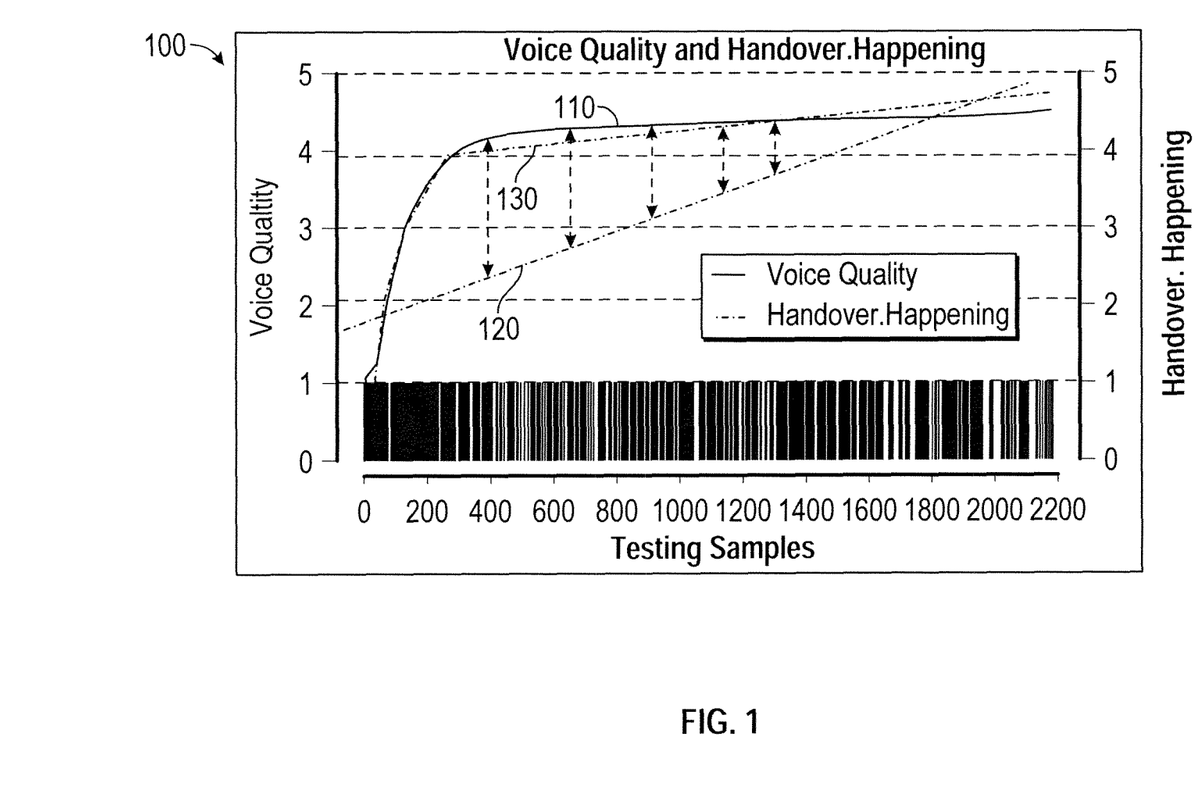
FIG. 1 illustrates an exemplary graph relating cellular voice call quality to a key performance indicator.

FIG. 1 illustrates an exemplary graph 100 relating cellular voice call quality to a compulsory KPI (e.g., Handover.Happening). In the graph 100, the compulsory KPI is represented on the horizontal (x) axis and the cellular voice call quality is represented on the vertical (y) axis. The multiple training data points are represented with the curve 110 on the graph 100. The "best fit" line relating the cellular voice call quality to the compulsory KPI is line 120. However, the curve 110 is much better estimated by the multiple joint lines 130 than by the single line 120.

The line 120 on the graph 100 represents the linear relationship between the compulsory KPI and the cellular voice call quality that was initially determined by the computing device for the purpose of determining whether the graphed KPI should be a compulsory KPI. However, upon inspection of the graph 100, it can be determined that the line 120 is not the best representation of the relationship between the compulsory KPI and the cellular voice call quality. Rather, the relationship between the compulsory KPI and the cellular voice call quality is best captured by the multiple joint lines 130. As shown in FIG. 1, a different linear relationship between the compulsory KPI and the cellular voice call quality exists for each line in the multiple joint lines 130.

The computing device determines, for each cluster in the two or more clusters (e.g., clusters corresponding to each line in the multiple joint lines 130) and using the multiple training data points, a mathematical relationship for calculating the cellular voice call quality within the cluster based on the one or more compulsory KPIs. The mathematical relationship may be determined using regression techniques. The regression may be linear, quadratic, exponential, logarithmic, etc. Several software products, for example, MATLAB®, developed by MathWorks Corporation in Natick, Mass., or SAS/

STAT®, developed by SAS Institute Inc. in Cary, N.C., are configured to implement regression techniques. As shown in FIG. 1, the mathematical relationship may be represented by the multiple joint lines 130. In some cases, the mathematical relationship may also be based on other KPIs or other values. The computing device may combine the mathematical relationships for the two or more clusters to generate a module for predicting the cellular voice call quality based on the one or more compulsory KPIs.

The computing device may provide an indication that the module has been generated. The indication may be displayed on the screen of the computing device or provided to another computer via an electronic message (e.g., email, text message, or push notification). The generated module may be used to predict new cellular voice call quality values based on input KPIs. By varying the values of the input KPIs, the generated module may be used to determine which KPIs may be changed (e.g., increased or decreased) to cause a greatest increase in cellular voice call quality. A mobile operator may then invest in changing those KPIs, rather than investing in changing other KPIs, which may not be as effective in improving cellular voice call quality. For example, FIG. 1, which is described in greater detail below, illustrates a relationship between cellular voice call quality and the KPI Handover.Happening. As shown in FIG. 1, as Handover.Happening increases, the voice quality also increases, with the greatest increase occurring at lower levels of Handover.Happening, when Handover.Happening is between 0 and 400. Based on this graph, a mobile operator with a Handover.Happening value of 200 may desire to invest resources in increasing Handover.Happening, while a mobile operator with a Handover.Happening value of 1600 may prefer to invest resources elsewhere, for example, in increasing other KPIs.

The notification regarding whether to invest resources in increasing Handover.Happening or another KPI may be provided over a network (e.g., the network shown in FIG. 6) to a computing device (e.g., a laptop computer or a mobile phone) belonging to an employee of the mobile operator. For example, this information may be displayed to the employee on the employee's screen or provided to the employee via email, text message, or mobile phone push notification. The email, text message, or push notification may be sent from a server to a client computing device (e.g., the laptop computer or the mobile phone). The employee may be employed as a network manager, a network engineer, or a manager of a team of network engineers at the mobile operator.

In FIG. 1, the voice quality curve (curve 110) has a concave down slope. If a linear regression (curve 120) is simply used to fit and forecast voice quality curve, the error, which is represented by the difference between the fitted value of the regression curve 120 and the true value on the curve 110, is relatively large, as shown by the lines with double arrows in FIG. 1. One manner of avoiding this problem is to split the curve 110 into multiple pieces, and conduct a separate regression for each piece, as shown by curve 130. For each piece, an appropriate regression curve may be applied fit the corresponding piece. This results in a piece-wise learning process in which the concave down curve is clustered into a few pieces (e.g., each joint segment in curve 130) by voice quality score. However, in some cases, the total number of clusters (e.g., segments in the curve 130) may not have been determined yet. If the number of clusters is large, processing time for separating the curve 110 may consume a large amount of time or processing resources. However, if the number of clusters is small, the derived model may not be accurate, as shown, for example, by curve 120 corresponding to a single cluster. The number of clusters, K, may be determined based on the two conditions below.

The first condition concerns classification accuracy, to the degree that the classification model will label a given testing sample to a correct cluster. The classification model may be trained based on training samples for which the voice quality score (and, thus, the associated cluster) and KPI value(s) are known. These training samples may be provided to the classification model for classification. The classification model may classify the training samples to a cluster. The accuracy of the classification may be determined, for example, as a percentage of the training samples that were classified to the correct cluster.

The second condition concerns regression accuracy for each cluster. After a given testing sample is classified to the correct cluster, the regression formula specific for the given cluster may be used to predict the voice quality score for this testing sample. The prediction result will be compared with its true value. The difference between true and predicted value may be measured to determine the regression accuracy.

Thus, the best K for the classification model may be derived. In some cases, a loop with K=2, 3, and 4 may be tested. In a case where the cellular voice call quality value varies between 0 and 5, testing more K values may not be needed or desirable. The details of the K=2, 3, and 4 cluster models are illustrated and described in conjunction with FIG. 5A.

FIG. 1 illustrates a single compulsory KPI being related to cellular voice call quality. However, in some implementations, the cellular voice call quality may be a function of multiple (e.g., 2, 3, 4, or more than 4) KPIs. A graph of multiple KPIs and the cellular voice call quality may appear more complex than the graph 100 of FIG. 1. The graph 100 provides one non-limiting example to show the relationship between a compulsory KPI and cellular voice call quality associated therewith.

Figure 2:
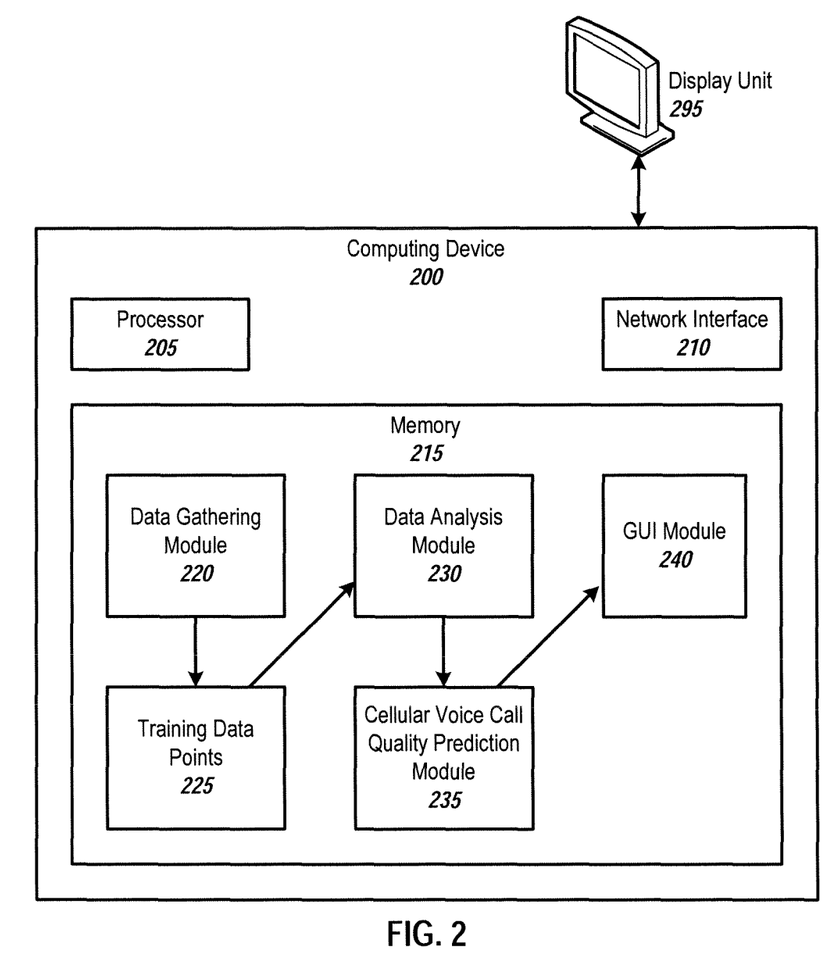
FIG. 2 illustrates an exemplary computing device for evaluating cellular voice call quality.

FIG. 2 illustrates an exemplary computing device 200 for evaluating cellular voice call quality. The computing device 200 may be a laptop computer, a desktop computer, a mobile phone, a tablet computer, a digital music player, a personal digital assistant (PDA), etc. The computing device 200 may be used to evaluate and improve cellular voice call quality in a network, for example, the mobile traffic network described in conjunction with FIG. 6 or a cellular network of a specified mobile operator in the United States or another country. The computing device 200 may be connected to the mobile traffic network or cellular network or may receive information about the mobile traffic network or cellular network without being directly connected to the network, for example, by manual user input of data related to the cellular network or mobile traffic network.

The computing device 200 includes a processor 205, a network interface 210, and a memory 215. The computing device 200 is connected to a display unit 295, which may display a graphical user interface (GUI) associated with software or hardware program(s) executing on the computing device 200. The display unit 295 may include one or more monitors, touchscreens, or projectors. The processor 205 executes programmed instructions, which may be stored in the memory 215. While a single processor 205 is illustrated, the computing device 200 may have one or multiple processors. If there are multiple processors, the multiple processors may together carry out the functionality of the processor 205 described herein. The multiple processors may be arranged in processing unit(s), for example, a central processing unit (CPU) or a graphics processing unit (GPU). The network interface 210 connects the computing device 200 to a network, for example, the mobile traffic network described in conjunction with FIG. 6. The network interface 210 may include one or more network interface controllers (NICs). The memory 215 stores data or instructions. As shown, the memory 215 stores a data gathering module 220, training data points 225, a data analysis module 230, a cellular voice call quality prediction module 235, and a GUI module 240.

The data gathering module 220, when executed by the processor 205, causes the processor 205 to collect multiple training data points 225 from a network. For example, the computing device 200 may measure the training data points 225 itself, via the network interface 210, the computing device 200 may receive a feed of the training data points 225 from other computer(s) via a network connection or via a direct connection, or the computing device 200 may prompt a user to manually input the training data points 225. Each data point in the training data points 225 includes a cellular voice call quality value and values for at least a subset of a set of KPIs related to a cellular voice call quality. Example KPIs which may be in the set of KPIs are described in Table 1. After the training data points 225 are gathered by the data gathering module 220, the training data points 225 are provided to the data analysis module 230. The training data points 225 may include measured data points from a cellular network, for example, a LTE network.

The data analysis module 230, when executed by the processor 205, causes the processor 205 to determine, for each KPI in the set of KPIs and using the training data points 225, a linear relationship between the KPI and the cellular voice call quality value. Each linear relationship is associated with a goodness of fit value, which may be calculated using Equation 1 or Equation 2 above. The processor 205 selects, based on the goodness of fit values, one or more compulsory KPIs. The processor 205 separates the training data points 225 into two or more clusters (e.g., corresponding to each line in the multiple joint lines 130 of FIG. 1) based on the compulsory KPI values or the cellular voice call quality values. The processor 205 determines, for each cluster in the two or more clusters and using the training data points 225 in the cluster, a mathematical relationship for calculating the cellular voice call quality within the cluster based on the one or more compulsory KPIs. The processor 205 generates the cellular voice call quality prediction module 235. The cellular voice call quality prediction module 235 may be used for predicting the cellular voice call quality value by combining the determined mathematical relationships.

The GUI module 240, when executed by the processor 205, causes the processor 205 to provide an indication that the cellular voice quality prediction module 235 has been generated. For example, the GUI module 240, when executed, may cause the processor 205 to provide, at the display unit 295, a graph of the relationship(s) between the compulsory KPI(s) and the cellular voice call quality, similar to the graph 100 of FIG. 1. The provided graph may include a graph of the determined mathematical relationship (e.g., multiple joint lines 130) and/or a graph of the training data points 225.

As shown in FIG. 2, the components 220, 225, 230, 235, and 240 of the memory 215 reside on a single computing device 200. However, these components 220, 225, 230, 235, and 240 may reside on different computing devices, which may together implement examples of the subject technology. The different computing devices may communicate with one another via a network or via a direct wired or wireless connection.

Figure 3:
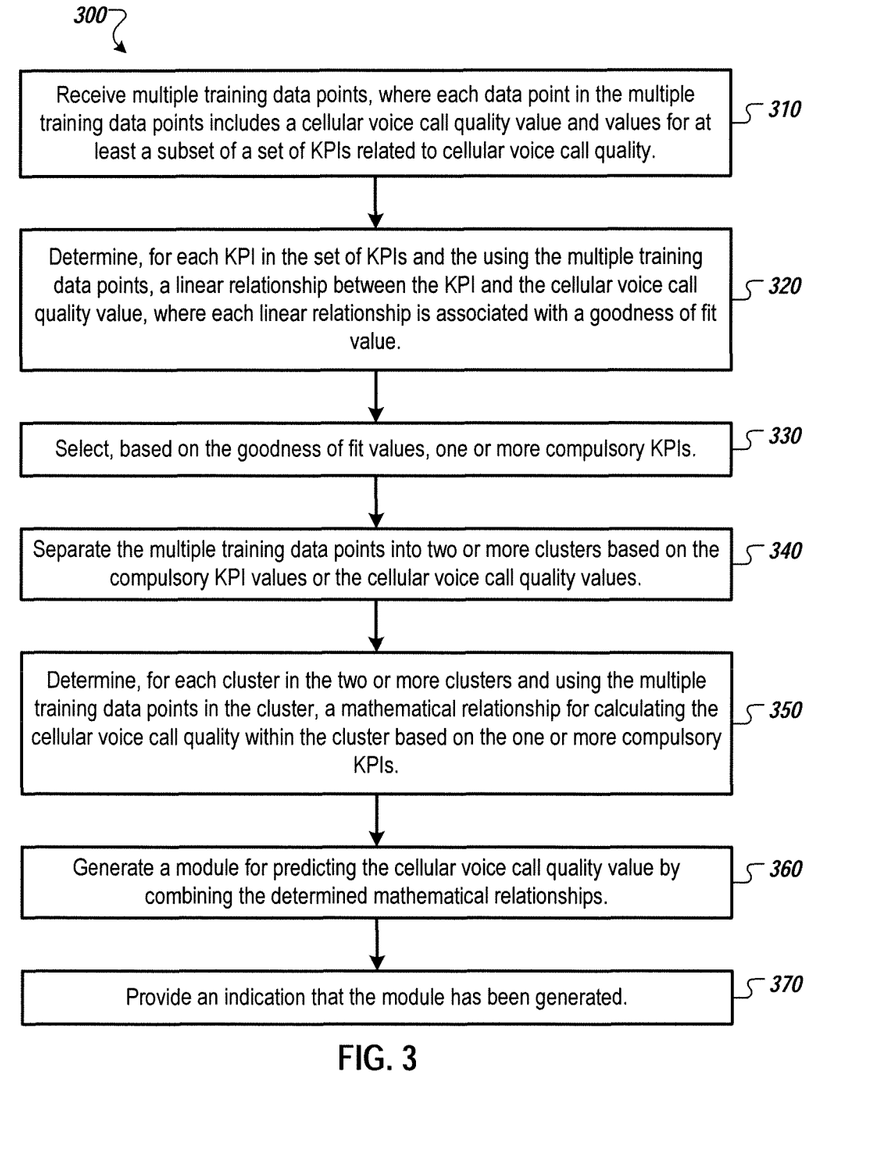
FIG. 3 illustrates an exemplary process for evaluating cellular voice call quality.

FIG. 3 illustrates an exemplary process 300 for evaluating cellular voice call quality. The cellular voice call quality may correspond to a POLQA score or to any other measure of cellular voice call quality. The process 300 begins at step 310, where a computing device (e.g., computing device 200, executing the data gathering module 220, the data analysis module 230, and the GUI module 240) receives multiple training data points (e.g., training data points 225). Each data point in the multiple training data points includes a cellular voice call quality value and values for at least a subset of a set of KPIs related to cellular voice call quality.

In step 320, the computing device determines, for each KPI in the set of KPIs and the using the multiple training data points, a linear relationship (e.g., line 120) between the KPI and the cellular voice call quality value. The linear relationship may be determined using linear regression techniques, as discussed above. Each linear relationship has a goodness of fit value. The goodness of fit value may be calculated using statistical techniques, for example Equation 1 or Equation 2.

In step 330, the computing device selects, based on the goodness of fit values, one or more compulsory KPIs. The one or more compulsory KPIs may correspond to KPIs having a goodness of fit value indicating a better fit than (e.g., being below) a first predetermined threshold. In some cases, the computing device may also select, based on the goodness of fit values, one or more optional KPIs different from the one or more compulsory KPIs. The one or more optional KPIs may correspond to KPIs having a goodness of fit value indicating a worse fit than the first predetermined threshold and a better fit than a second predetermined threshold. In one example, the first predetermined threshold is 0.3 and the second predetermined threshold is 0.5. Alternatively, the first predetermined threshold and the second predetermined threshold may be set such that, out of all of the available KPIs, 15% are a better fit than the first threshold and another 25% are a better fit than the second threshold.

In step 340, the computing device separates the multiple training data points into two or more clusters (e.g., corresponding to each line in the multiple joint lines 130) based on the compulsory KPI values or the cellular voice call quality values. In some cases, the computing device may separate the multiple training data points into different numbers of clusters, where each of the different numbers is greater than or equal to two (e.g., two clusters, three clusters, and four clusters). The computing device may determine, based on the multiple training data points, which of the numbers of clusters (e.g., two clusters, three clusters, or four clusters) results in a most accurate module for predicting the cellular voice call quality. The determination may be made using artificial intelligence techniques for inspecting the data and determining, based on the inspection of the data, the number of clusters. A most accurate model may have a best (e.g., indicating most accuracy) goodness of fit value, as calculated, for example, by Equation 1 or Equation 2.

In step 350, the computing device determines, for each cluster in the two or more clusters and using the multiple training data points in the cluster, a mathematical relationship (e.g., multiple joint lines 130) for calculating the cellular voice call quality within the cluster based on the one or more compulsory KPIs. If optional KPIs were selected, the mathematical relationship for calculating the cellular voice call quality may be based on the compulsory KPI(s) and at least one optional KPI. Alternatively, the mathematical relationship may not be based on optional KPIs.

In step 360, the computing device generates a module (e.g., cellular voice call quality prediction module 235) for predicting the cellular voice call quality value by combining the determined mathematical relationships (e.g., multiple joint lines 130). For example, the module may store function(s) corresponding to the determined mathematical relationships.

The module may store which KPI(s) are the compulsory KPI(s) and which KPI(s), if any, are the optional KPI(s).

In step 370, the computing device provides an indication that the module has been generated. For example, the computing device may present, at a display unit of the computing device, a graph corresponding to output of the module. The graph may include axes for the KPI(s) and the cellular voice call quality value. The graph may include representations of the multiple training data points (e.g., training data points 225) and representation of functions corresponding to the generated module (e.g., multiple joint lines 130). After step 370, the process 300 ends.

In some examples, the generated module may be used to predict a new cellular voice call quality value based on input KPI(s). The generated module may provide, using the display unit of the computing device or another output unit, an indication of one or more of the input KPI(s) to change for improving the predicted cellular voice call quality value in a case where the predicted cellular voice call quality value is insufficient. The generated module may be provided with price(s) for changing the KPI(s), and indicate, based on the price(s), which KPI(s) should be changed to cause a greatest increase in cellular voice call quality per unit of currency (e.g., dollar) spent. The price(s) for changing the KPI(s) may be input to the computing device by a network engineer based on the network engineer's experience working with vendors on increasing the KPI(s) or based on price quotes from the vendors for increasing the KPI(s).

As set forth above, the steps 310-370 are carried out according to a specified order. However, the steps may be carried out in any order, not necessarily the one specified above. In some examples, one or more of the steps 310-370 may be skipped.

Figure 4:
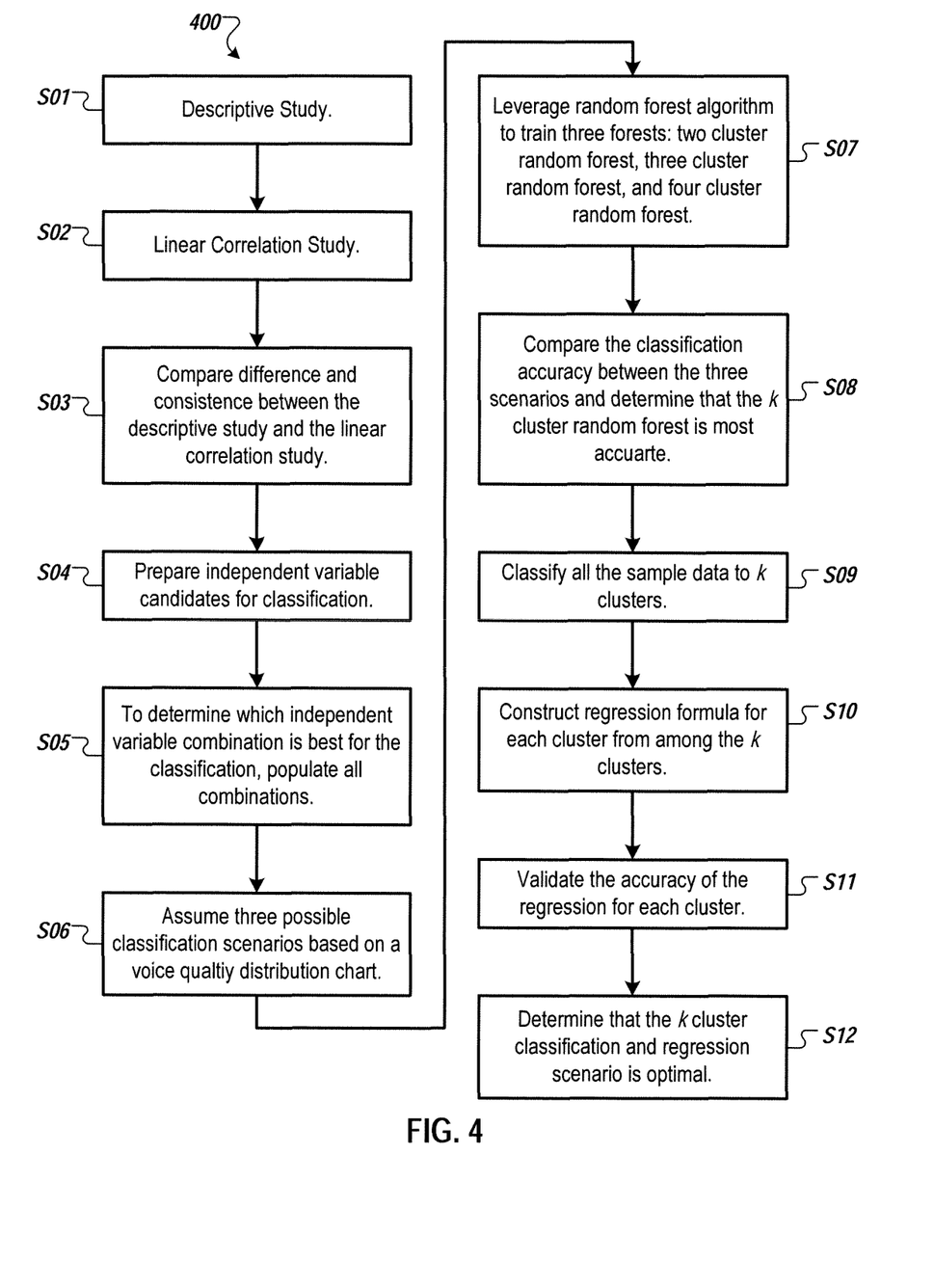
FIG. 4 illustrates an exemplary process for creating a model of cellular voice call quality.

FIG. 4 illustrates an exemplary process 400 for creating a model of cellular voice call quality. The process 400 may be carried out using one or more computers with or without user assistance.

Steps S01-S05 of the process 400 may be referred to as "feature selection." In these steps, appropriate KPIs are selected for the classification model, which is developed in steps S06-S12.

The process 400 begins at step S01, where a descriptive study is conducted. In the descriptive study, a pair-wise relationship of cellular voice call quality and KPI(s) may be visualized. The KPI(s) showing high impact on the cellular voice call quality may be selected as independent variable candidates.

In step S02, a linear correlation study is conducted. The Spearman Correlation Algorithm is leveraged to test the linear correlation between the cellular voice call quality and each KPI in the KPI(s). From step S01, it may be determined that the pair-wise relationship between the cellular voice call quality and a given KPI might not be linear. Thus, step S02 detects a linear correlation, which is a reference result for step S01.

In step S03, the difference and consistence between the descriptive study of step S01 and the linear correlation study of step S02 are compared.

In step S04, independent variable candidates are prepared for classification. Based on steps S01, S02, and S03, compulsory KPI independent variable(s) and optional KPI independent variable(s) may be selected. In some cases, there may be m compulsory KPIs and n optional KPIs, where n and m are positive integers.

In step S05, to determine which independent variable combination is the best for the classification, all combinations are populated. The combination among the possible combinations, including all of the compulsory KPIs and none, some, or all of the optional KPIs, that is the "best fit" among the available combinations may be selected. The possible combinations are expressed in Equation 3, where C represents the combinations.

$$C_m^m \times (C_0^n + C_1^n + \ldots + C_{n-1}^n + C_n^n) = 2^n \qquad \text{Equation 3}$$

Which combination out of the $2^n$ combinations expressed in Equation 3 is best may be determined by classification accuracy, meaning attempting the classification process with the $2^n$ combinations, and then selecting the one with least classification error. For example, if n=2, and the first combination has a 90% classification accuracy, while the second combination has a 95% classification accuracy, then the second combination is best.

In step S06, three possible classification scenarios are assumed based on a cellular voice call quality distribution chart developed from the independent variable combinations in step S05.

In step S07, the random forest algorithm is leveraged to train three forests: a two cluster random forest, a three cluster random forest, and a four cluster random forest. The three forests are trained with each of the combinations 1 through $2^n$ described in conjunction with Equation 3.

In step S08, the classification accuracy between the three scenarios—the two cluster random forest, the three cluster random forest, and the four cluster random forest—are compared. For each forest, the highest accuracy among the combinations and the average accuracy among the combinations are determined. It may be determined that the k cluster random forest, where k is a number between two and four, is most accurate based on the k cluster random forest having the greatest average accuracy among the two cluster random forest, the three cluster random forest, and the four cluster random forest.

In step S09, all of the sample data is classified to k clusters based on the k cluster random forest selected in step S08.

In step S10, a regression formula is constructed for each cluster among the k clusters. The cellular voice call quality for each cluster is expressed as a function of the independent variables determined in step S05.

In step S11, the accuracy of the regression for each cluster among the k clusters is evaluated.

In step S12, it is determined that the k cluster classification and regression scenario is optimal. After step S12, a cellular voice call quality value may be determined based on the independent variable KPI(s) as described herein in conjunction with FIG. 5B. After step S12, the process 400 ends.

As set forth above, the steps S01-S12 are carried out according to a specified order. However, the steps may be carried out in any order, not necessarily the one specified above. In some examples, one or more of the steps S01-S12 may be skipped.

Figure 5A:
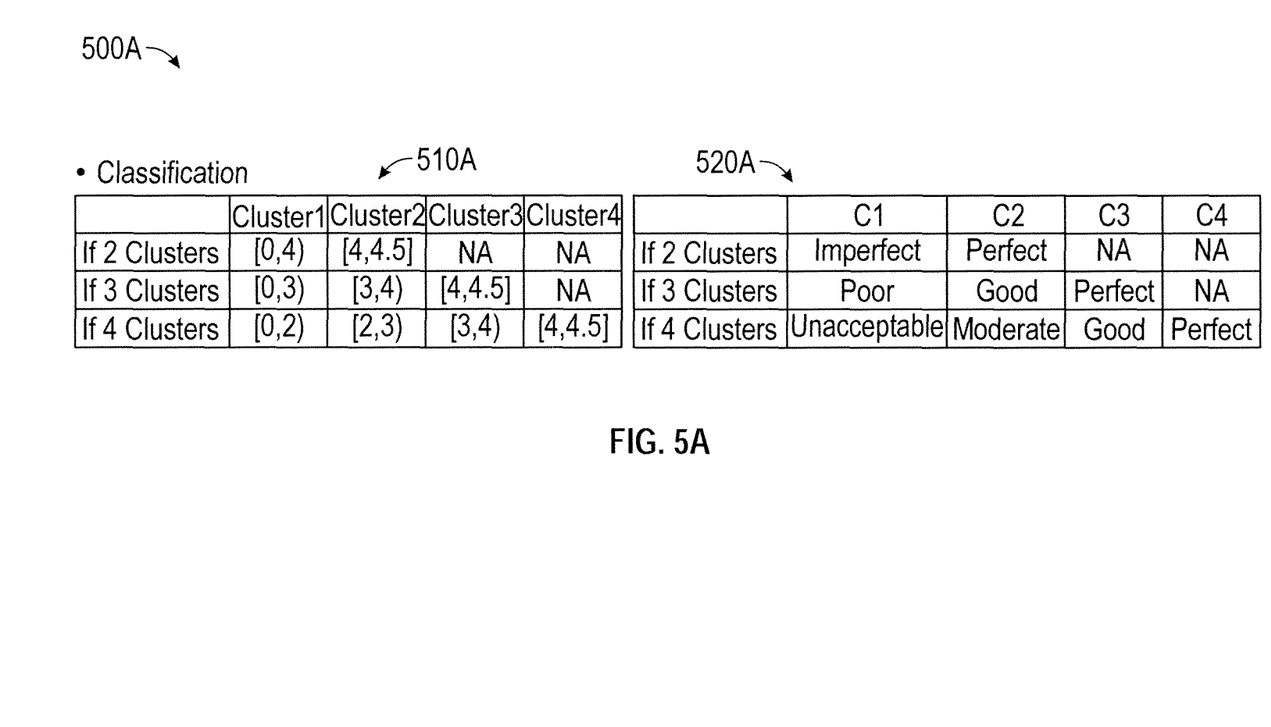
FIG. 5A illustrates exemplary cluster classifications for cellular voice call quality.

FIG. 5A illustrates exemplary cluster classifications 500A for cellular voice call quality. The classifications 500A include table 510A and table 520A. Table 510A shows the cellular voice call quality ranges for each cluster in a two, three, and four cluster scenario. In Table 510A, the notation [a, c] refers to a range that is inclusive of a and inclusive of c, in other words, a≤x≤c. The notation [a, c) refers to a range that is inclusive of a and exclusive of c, in other words, a≤x<c. According to table 510A, if there are two clusters, the first cluster corresponds to voice quality between 0 and 4, and the second cluster corresponds to voice quality between 4 and 4.5. If there are three clusters, the first cluster corresponds to voice quality between 0 and 3, the second cluster corresponds to voice quality between 3 and 4, and the third cluster corresponds to voice quality between 4 and 4.5. If there are four clusters, the first cluster corresponds to voice quality between 0 and 2, the second cluster corresponds to voice quality between 2 and 3, the third cluster corresponds to voice quality between 3 and 4, and the fourth cluster corresponds to voice quality between 4 and 4.5. Table 520A includes a text description of the voice call quality for each cluster in the two, three, and four cluster scenarios. According to table 520A, if there are two clusters the first cluster corresponds to imperfect voice quality, and the second cluster corresponds to perfect voice quality. If there are three clusters, the first cluster corresponds to poor voice quality, the second cluster corresponds to good voice quality, and the third cluster corresponds to perfect voice quality. If there are four clusters, the first cluster corresponds to unacceptable voice quality, the second cluster corresponds to moderst voice quality, the third cluster corresponds to good voice quality, and the fourth cluster corresponds to perfect voice quality.

Figure 5B:
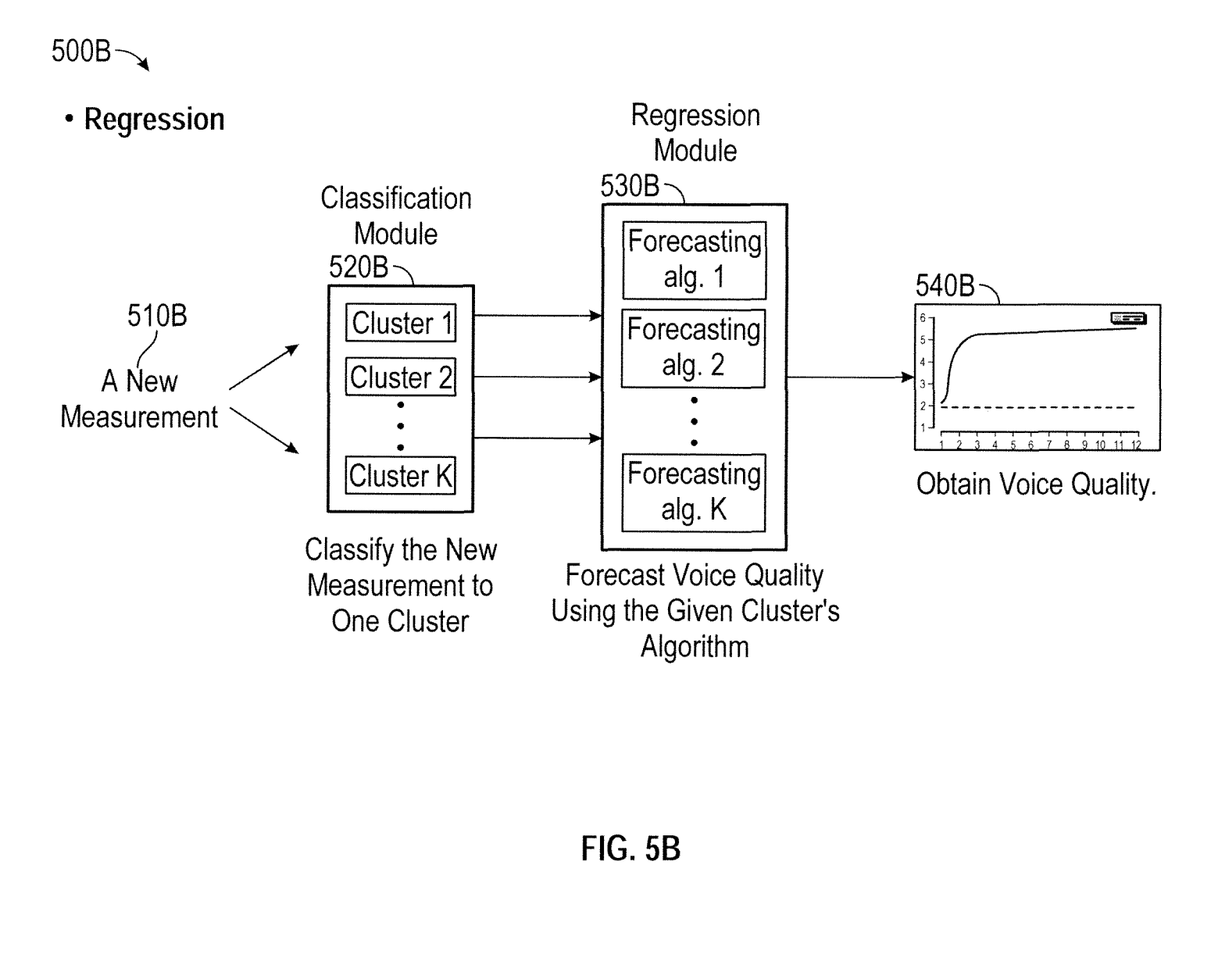
FIG. 5B illustrates an exemplary process for determining cellular voice call quality based on key performance indicator(s)

FIG. 5B illustrates an exemplary process 500B for determining cellular voice call quality based on key performance indicator(s). The process 500B may be implemented after the completion of the process 400 of FIG. 4. As shown in FIG. 5B, the process 500B begins at step 510B, where a new measurement is received. In step 520B a classification module of a computer classifies the new measurement into one of the k clusters determined using the process 400. In step 530B, a forecasting algorithm associated with the one of the k clusters is used to forecast the cellular voice call quality. In step 540B, the cellular voice call quality is obtained using the forecasting algorithm. After step 540B, the process 500B ends. The classification module and the regression module, which are described in conjunction with FIG. 5B, may be components of the GUI module 240 of FIG. 2.

Figure 6:
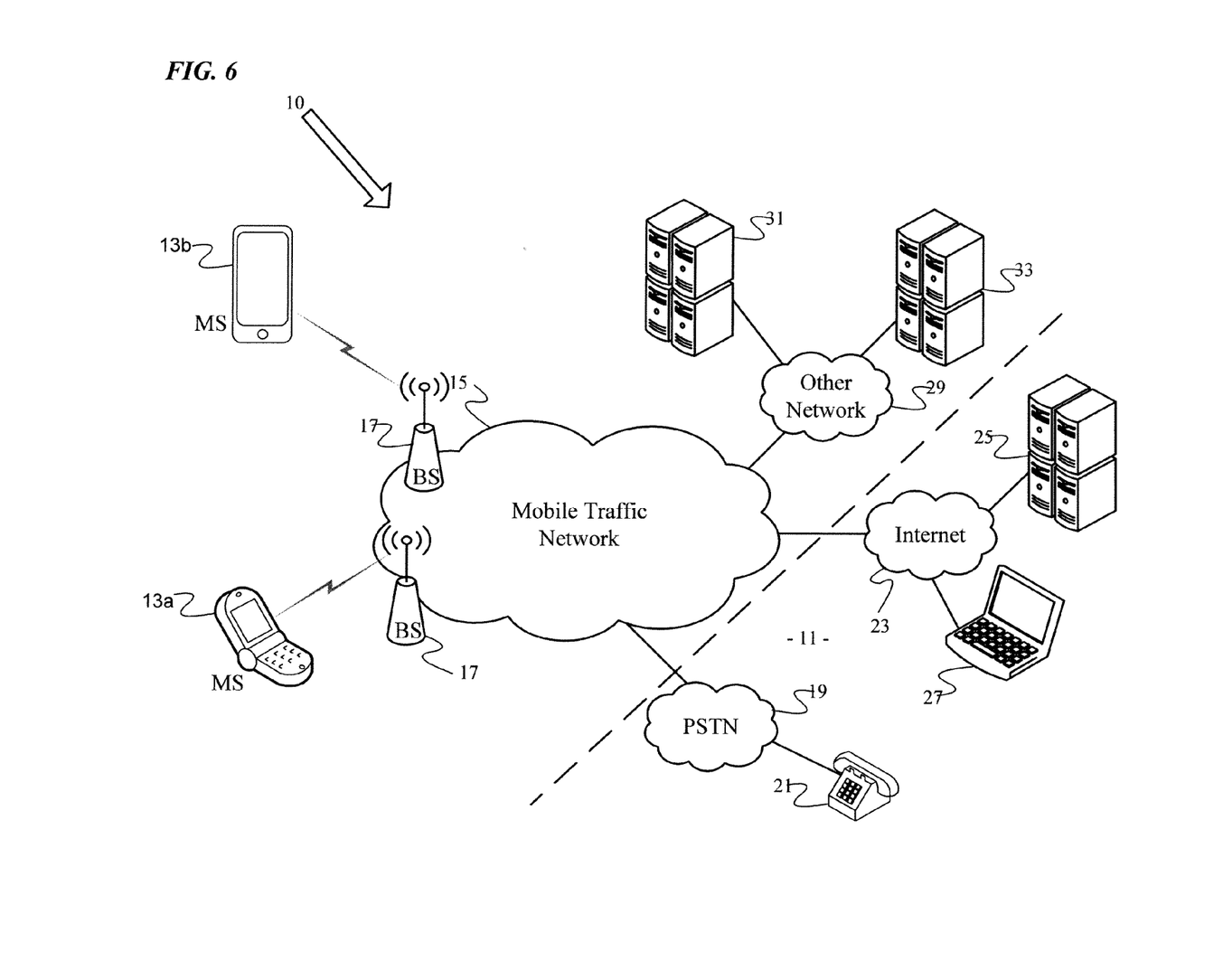
FIG. 6 is a high-level functional block diagram of an example of a system of networks/devices that provide various communications for mobile stations, for which network traffic may be analyzed and forecasted.

FIG. 6 illustrates a system 10 offering a variety of mobile communication services. The example shows simply two mobile stations (MSs) 13a and 13b as well as a mobile communication network 15. The stations 13a and 13b are examples of mobile stations. The network 15 provides mobile wireless communications services to those stations as well as to other mobile stations (not shown), for example, via a number of base stations (BSs) 17. The network 15 may correspond to the network of which cellular voice call quality is evaluated using the techniques described herein. The present techniques may be implemented in or used to study any of a variety of available mobile networks 15, and the drawing shows only a very simplified example of a few relevant elements of the network 15 for purposes of discussion here.

The wireless mobile communication network 15 might be implemented as a network conforming to the code division multiple access (CDMA) IS-95 standard, the 3rd Generation Partnership Project 2 (3GPP2) wireless IP network standard or the Evolution Data Optimized (EVDO) standard, the Global System for Mobile (GSM) communication standard, a time division multiple access (TDMA) standard, the Universal Mobile Telecommunications System (UMTS) standard, the LTE standard belonging to 3GPP or other standards used for public mobile wireless communications. The mobile stations 13 may be capable of voice telephone communications through the network 15. Alternatively or additionally, the mobile stations 13a and 13b may be capable of data communications through the particular type of network 15 (and the users thereof typically will have subscribed to data service through the network).

The network 15 allows users of the mobile stations such as 13a and 13b (and other mobile stations not shown) to initiate and receive telephone calls to each other as well as through the public switched telephone network or "PSTN" 19 and telephone stations 21 connected to the PSTN. The network 15 typically offers a variety of data services via the Internet 23, such as downloads, web browsing, email, etc. By way of example, the drawing shows a laptop PC type user terminal 27 as well as a server 25 connected to the Internet 23; and the data services for the mobile stations 13 via the Internet 23 may be with devices like those shown at 25 and 27 as well as with a variety of other types of devices or systems capable of data communications through various interconnected networks.

Mobile stations 13 can take the form of portable handsets, smart-phones or personal digital assistants, although they may be implemented in other form factors. Program applications can be configured to execute on many different types of mobile stations 13. For example, a mobile station application can be written to execute on a binary runtime environment for mobile (BREW-based) mobile station, a Windows Mobile based mobile station, Android, I-Phone, Java Mobile, or RIM based mobile station such as a BlackBerry or the like. Some of these types of devices can employ a multi-tasking operating system.

The mobile communication network 10 can be implemented by a number of interconnected networks. Hence, the overall network 10 may include a number of radio access networks (RANs), as well as regional ground networks interconnecting a number of RANs and a wide area network (WAN) interconnecting the regional ground networks to core network elements. A regional portion of the network 10, such as that serving mobile stations 13, can include one or more RANs and a regional circuit and/or packet switched network and associated signaling network facilities.

Physical elements of a RAN operated by one of the mobile service providers or carriers, include a number of base stations represented in the example by the base stations (BSs) 17. Although not separately shown, such a base station 17 can include a base transceiver system (BTS), which can communicate via an antennae system at the site of base station and over the airlink with one or more of the mobile stations 13, when the mobile stations are within range. Each base station can include a BTS coupled to several antennae mounted on a radio tower within a coverage area often referred to as a "cell." The BTS is the part of the radio network that sends and receives RF signals to/from the mobile stations 13 that are served by the base station 17.

The radio access networks can also include a traffic network represented generally by the cloud at 15, which carries the user communications and data for the mobile stations 13 between the base stations 17 and other elements with or through which the mobile stations communicate. The network can also include other elements that support functionality other than device-to-device media transfer services such as messaging service messages and voice communications. Specific elements of the network 15 for carrying the voice and data traffic and for controlling various aspects of the calls or sessions through the network 15 are omitted here form simplicity. It will be understood that the various network elements can communicate with each other and other aspects of the mobile communications network 10 and other networks (e.g., the public switched telephone network (PSTN) and the Internet) either directly or indirectly.

The carrier will also operate a number of systems that provide ancillary functions in support of the communications services and/or application services provided through the network 10, and those elements communicate with other nodes or elements of the network 10 via one or more private IP type packet data networks 29 (sometimes referred to as an Intranet), i.e., a private networks. Generally, such systems are part of or connected for communication via the private network 29. A person skilled in the art, however, would recognize that systems outside of the private network could serve the same functions as well. Examples of such systems, in this case operated by the network service provider as part of the overall network 10, which communicate through the intranet type network 29, include one or more application servers 31 and a related authentication server 33 for the application service of server 31.

A mobile station 13 communicates over the air with a base station 17 and through the traffic network 15 for various voice and data communications, e.g. through the Internet 23 with a server 25 and/or with application servers 31. Services offered by the mobile service carrier may be hosted on a carrier operated application server 31, for communication via the networks 15 and 29. Server such as 25 and 31 may provide any of a variety of common application or service functions in support of or in addition to an application program running on the mobile station 13. For a given service, an application program within the mobile station may be considered as a 'client' and the programming at 25 or 31 may be considered as the 'server' application for the particular service.

To insure that the application service offered by server 31 is available to only authorized devices/users, the provider of the application service also deploys an authentication server 33. The authentication server 33 could be a separate physical server as shown, or authentication server 33 could be implemented as another program module running on the same hardware platform as the server application 31. Essentially, when the server application (server 31 in our example) receives a service request from a client application on a mobile station 13, the server application provides appropriate information to the authentication server 33 to allow server application 33 to authenticate the mobile station 13 as outlined herein. Upon successful authentication, the server 33 informs the server application 31, which in turn provides access to the service via data communication through the various communication elements (e.g. 29, 15 and 17) of the network 10.

The subject technology may be implemented in conjunction with touch screen type mobile stations as well as to non-touch type mobile stations. Hence, our simple example shows the mobile station (MS) 13a as a non-touch type mobile station and shows the mobile station (MS) 13 as a touch screen type mobile station. Some implementation may involve at least some execution of programming in the mobile stations as well as implementation of user input/output functions and data communications through the network 15, from the mobile stations. Those skilled in the art presumably are familiar with the structure, programming and operations of the various types of mobile stations.

As shown by the above discussion, functions relating to evaluating cellular voice call quality may be implemented on computers connected for data communication via the components of a packet data network, as shown in FIG. 6. For example, the computing device 200 may correspond to mobile station 13a, mobile station 13b, server 25, user terminal 27 or application servers 31. Although special purpose devices may be used, such devices also may be implemented using one or more hardware platforms intended to represent a general class of data processing device commonly used to run "server" programming so as to implement the functions discussed above, albeit with an appropriate network connection for data communication.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data. In operation, the code is stored within the general-purpose computer platform. At other times, however, the software may be stored at other locations and/or transported for loading into the appropriate general-purpose computer system. Execution of such code by a processor of the computer platform enables the platform to implement the methodology described herein.

Figure 7:
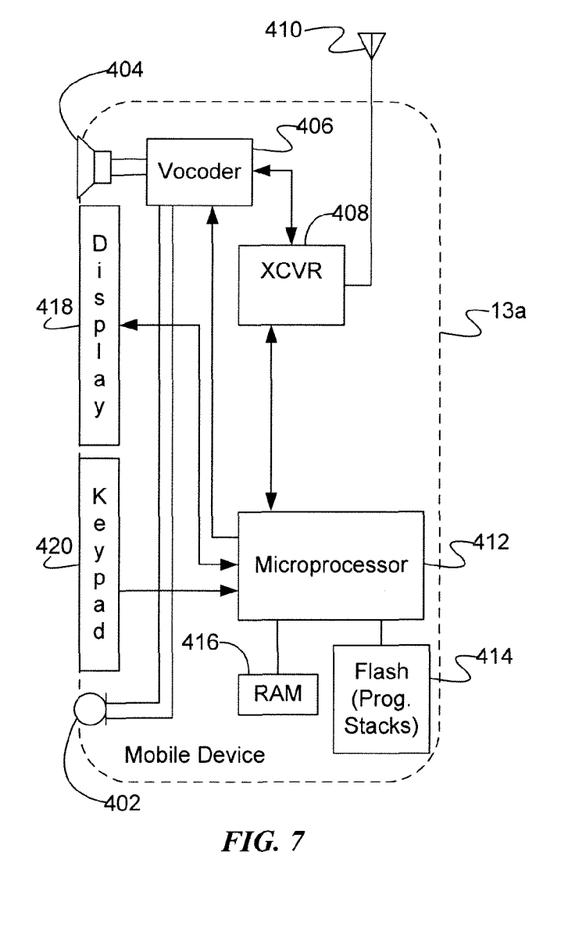
FIG. 7 is a high-level functional block diagram of an exemplary non-touch type mobile device which may be involved in analyzing and forecasting network traffic.

FIG. 7 provides a block diagram illustration of an exemplary non-touch type mobile device 13a, which may correspond to the mobile device 13. Although the mobile device 13a may be a smart-phone or may be incorporated into another device, such as a personal digital assistant (PDA) or the like, for discussion purposes, the illustration shows the mobile device 13a is in the form of a handset. The handset embodiment of the mobile device 13a functions as a normal digital wireless telephone station. For that function, the mobile device 13a includes a microphone 402 for audio signal input and a speaker 404 for audio signal output. The microphone 402 and speaker 404 connect to voice coding and decoding circuitry (vocoder) 406. For a voice telephone call, for example, the vocoder 406 provides two-way conversion between analog audio signals representing speech or other audio and digital samples at a compressed bit rate compatible with the digital protocol of wireless telephone network communications or voice over packet (Internet Protocol) communications.

For digital wireless communications, the mobile device 13a also includes at least one digital transceiver (XCVR) 408. The mobile device 13a may be configured for digital wireless communications using one or more of the common network technology types. The concepts discussed here encompass embodiments of the mobile device utilizing any digital transceivers that conform to current or future developed digital wireless communication standards. The mobile device may also be capable of analog operation via a legacy network technology.

The transceiver 408 provides two-way wireless communication of information, such as vocoded speech samples and/or digital information, in accordance with the technology of the network 165. The transceiver 408 also sends and receives a variety of signaling messages in support of the various voice and data services provided via the mobile device 13a and the communication network. Each transceiver 408 connects through RF send and receive amplifiers (not separately shown) to an antenna 410. The transceiver may also support various types of mobile messaging services, such as short message service (SMS), enhanced messaging service (EMS) and/or multimedia messaging service (MMS).

The mobile device 13a includes a display 418 for displaying messages, menus or the like, call related information dialed by the user, calling party numbers, etc. A keypad 420 enables dialing digits for voice and/or data calls as well as generating selection inputs, for example, as may be keyed-in by the user based on a displayed menu or as a cursor control and selection of a highlighted item on a displayed screen. The display 418 and keypad 420 are the physical elements providing a textual or graphical user interface. Various combinations of the keypad 420, display 418, microphone 402 and speaker 404 may be used as the physical input output elements of the graphical user interface (GUI), for multimedia (e.g., audio and/or video) communications. Of course other user interface elements may be used, such as a trackball, as in some types of PDAs or smart phones.

In addition to normal telephone and data communication related input/output (including message input and message display functions), the user interface elements also may be used for display of menus and other information to the user and user input of selections.

A microprocessor 412 serves as a programmable controller for the mobile device 13a, in that it controls all operations of the mobile device 13a in accordance with programming that it executes, for all normal operations, including those under consideration here. In the example, the mobile device 13a includes flash type program memory 414, for storage of various "software" or "firmware" program routines and mobile configuration settings, such as mobile directory number (MDN) and/or mobile identification number (MIN), etc. The flash type program memory 414 stores programmed instructions, including those described herein. The mobile device 13a may include a non-volatile random access memory (RAM) 416 for a working data processing memory. Of course, other storage devices or configurations may be added to or substituted for those in the example. In a present implementation, the flash type program memory 414 stores firmware such as a boot routine, device driver software, an operating system, call processing software and vocoder control software, and any of a wide variety of other applications, such as client browser software and short message service software. The memories 414, 416 also store various data, such as telephone numbers and server addresses, downloaded data such as multimedia content, and various data input by the user. Programming stored in the flash type program memory 414, sometimes referred to as "firmware," is loaded into and executed by the microprocessor 412.

Figure 8:
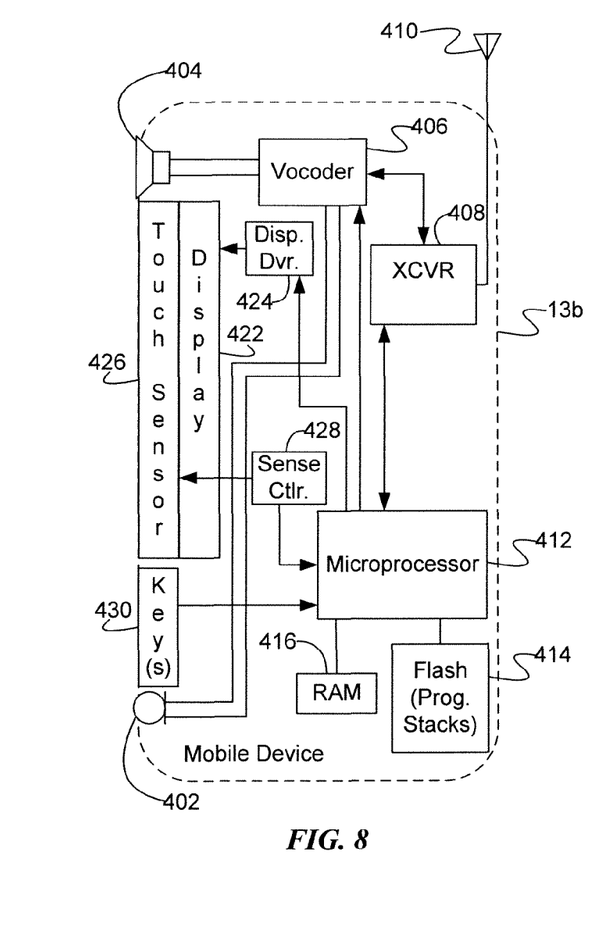
FIG. 8 is a high-level functional block diagram of an exemplary touch screen type mobile device which may be involved in analyzing and forecasting network traffic.

For purposes of such a discussion, FIG. 8 provides a block diagram illustration of an exemplary touch screen type mobile device 13b. Although configured somewhat differently, at least logically, a number of the elements of the exemplary touch screen type mobile device 13b are similar to the elements of mobile device 13a, and are identified by like reference numbers in FIGS. 5 and 6. For example, the touch screen type mobile device 13b includes a microphone 402, speaker 404 and vocoder 406, for audio input and output functions, much like in the earlier example. The mobile device 13b also includes at least one digital transceiver (XCVR) 408, for digital wireless communications, although the mobile device 13b may include an additional digital or analog transceiver. The concepts discussed here encompass embodiments of the mobile device 13b utilizing any digital transceivers that conform to current or future developed digital wireless communication standards. As in the mobile device 13a, the transceiver 408 provides two-way wireless communication of information, such as vocoded speech samples and/or digital information, in accordance with the technology of the network 165. The transceiver 408 also sends and receives a variety of signaling messages in support of the various voice and data services provided via the mobile device 13b and the network 165. Each transceiver 408 connects through RF send and receive amplifiers (not separately shown) to an antenna 410. The transceiver may also support various types of mobile messaging services, such as short message service (SMS), enhanced messaging service (EMS) and/or multimedia messaging service (MMS).

As in the example of the mobile device 13a, a microprocessor 412 serves as a programmable controller for the mobile device 13b, in that it controls all operations of the mobile device 13b in accordance with programming that it executes, for all normal operations, and for operations described herein.

In the example, the mobile device 13b includes flash type program memory 414, for storage of various program routines and mobile configuration settings. The mobile device 13b may also include a non-volatile random access memory (RAM) 416 for a working data processing memory. Of course, other storage devices or configurations may be added to or substituted for those in the example. Hence, outlined above, the mobile device 13b includes a processor, and programming stored in the flash memory 414 configures the processor so that the mobile device is capable of performing various desired functions, including the functions described herein.

In the example of FIG. 8, the user interface elements included a display and a keypad. The mobile device 13b may have a limited number of key(s) 430, but the user interface functions of the display and keypad are replaced by a touchscreen display arrangement. At a high level, a touchscreen display is a device that displays information to a user and can detect occurrence and location of a touch on the area of the display. The touch may be an actual touch of the display device with a finger, stylus or other object, although at least some touchscreens can also sense when the object is in close proximity to the screen. Use of a touchscreen display as part of the user interface enables a user to interact directly with the information presented on the display.

Hence, the exemplary mobile device 13b includes a display 422, which the microprocessor 412 controls via a display driver 424, to present visible outputs to the device user. The mobile device 13b also includes a touch/position sensor 426. The sensor 426 is relatively transparent, so that the user may view the information presented on the display 422. A sense circuit 428 sensing signals from elements of the touch/position sensor 426 and detects occurrence and position of each touch of the screen formed by the display 422 and sensor 426. The sense circuit 428 provides touch position information to the microprocessor 412, which can correlate that information to the information currently displayed via the display 422, to determine the nature of user input via the screen.

The display 422 and touch sensor 426 (and possibly one or more keys 430, if included) are the physical elements providing the textual and graphical user interface for the mobile device 13b. The microphone 402 and speaker 404 may be used as user interface elements for audio input and output.

The structure and operation of the mobile devices 13a and 13b, as outlined above, were described to by way of example only.

The subject technology, in some implementations, provides techniques for evaluating cellular voice call quality in a 3G or LTE network. Training data points are received. Each data point includes a call quality value and values of KPIs related to call quality. For each KPI, a linear relationship, having a goodness-of-fit value, between the KPI and the call quality value is determined using the multiple data points. Compulsory KPIs are selected based on the goodness-of-fit values. The training data points are separated into clusters based on the compulsory KPI values and the quality values. For each cluster, a mathematical relationship for calculating the call quality within the cluster is determined based on the one or more compulsory KPIs. A module is generated for predicting the call quality value by combining the determined mathematical relationships. Advantageously, cellular voice call quality may be estimated more accurately and/or at a lower cost than by using other techniques. Also, relationships between KPIs and the cellular voice call quality may be determined, allowing a network engineer of a mobile operator to determine which KPI(s) should be improved in order to cause the greatest improvement in cellular voice call quality.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and may be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, should may they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such teems and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
    receiving, at a computing device, a plurality of training data points, wherein each data point in the plurality of training data points includes a cellular voice call quality value and values for at least a subset of a set of key performance indicators (KPIs) related to cellular voice call quality;
    determining, for each KPI in the set of KPIs and the using the plurality of training data points, a linear relationship between the KPI and the cellular voice call quality value, wherein each linear relationship is associated with a goodness of fit value;
    selecting, based on the goodness of fit values, one or more compulsory KPIs;
    separating the plurality of training data points into a plurality of clusters based on at least one of the compulsory KPI values or the cellular voice call quality values;
    determining, for each cluster in the plurality of clusters and using the plurality of training data points in the cluster, a mathematical relationship for calculating the cellular voice call quality within the cluster based on the one or more compulsory KPIs;
    generating a module for predicting the cellular voice call quality value by combining the determined mathematical relationships; and
    reporting, based on information generated using the module, that changing one or more of the compulsory KPI values would improve the cellular voice call quality.

2. The method of claim 1, further comprising:
    providing, via the computing device, an indication that the module has been generated.

3. The method of claim 1, further comprising:
    calculating the goodness of fit value associated with each linear relationship using a regression analysis technique.

4. The method of claim 1, further comprising:
    predicting, using the generated module, a new cellular voice call quality value based on input KPIs; and
    providing, via the computing device, an indication of one or more of the input KPIs to change for improving the predicted cellular voice call quality value in a case where the predicted cellular voice call quality value is insufficient.

5. The method of claim 1, wherein the cellular voice call quality value comprises a Perceptual Objective Listening Quality Assessment (POLQA) score.

6. The method of claim 1, further comprising:
    selecting, based on the goodness of fit values, one or more optional KPIs different from the one or more compulsory KPIs, wherein the mathematical relationship for calculating the cellular voice call quality is based on the one or more compulsory KPIs and at least one of the one or more optional KPIs.

7. The method of claim 6, wherein:
    the one or more compulsory KPIs have goodness of fit values below a first threshold value; and
    the one or more optional KPIs have goodness of fit values exceeding the first threshold value and below a second threshold value.

8. The method of claim 1, wherein:
    separating the plurality of training data points into the plurality of clusters based on the compulsory KPI values or the cellular voice call quality values comprises:
        separating the plurality of data points into different numbers of clusters, wherein each of the different numbers is greater than or equal to two; and determining, based on the plurality of training data points, which of the numbers of clusters results in a most accurate module for predicting the cellular voice call quality.

9. The method of claim 1, wherein the plurality of training data points comprise measured data points from a mobile device or an audio sample in a long term evolution (LTE) cellular network.

10. A non-transitory computer-readable medium comprising instructions which, when executed by a computer, cause the computer to:
receive, at the computer, a plurality of training data points, wherein each data point in the plurality of training data points includes a cellular voice call quality value and values for at least a subset of a set of key performance indicators (KPIs) related to cellular voice call quality;
determine, for each KPI in the set of KPIs and the using the plurality of training data points, a linear relationship between the KPI and the cellular voice call quality value, wherein each linear relationship is associated with a goodness of fit value;
select, based on the goodness of fit values, one or more compulsory KPIs;
separate the plurality of training data points into a plurality of clusters based on at least one of the compulsory KPI values or the cellular voice call quality values;
determine, for each cluster in the plurality of clusters and using the plurality of training data points in the cluster, a mathematical relationship for calculating the cellular voice call quality within the cluster based on the one or more compulsory KPIs;
generate a module for predicting the cellular voice call quality value by combining the determined mathematical relationships; and
report, based on information generated using the module, that changing one or more of the compulsory KPI values would improve the cellular voice call quality.

11. The computer-readable medium of claim 10, further comprising instructions which, when executed by the computer, cause the computer to:
provide an indication that the module has been generated.

12. The computer-readable medium of claim 10, further comprising instructions which, when executed by the computer, cause the computer to:
calculate the goodness of fit value associated with each linear relationship using a regression analysis technique.

13. The computer-readable medium of claim 10, further comprising instructions which, when executed by the computer, cause the computer to:
predict, using the generated module, a new cellular voice call quality value based on input KPIs; and
provide, via the computer, an indication of one or more of the input KPIs to change for improving the predicted cellular voice call quality value in a case where the predicted cellular voice call quality value is insufficient.

14. The computer-readable medium of claim 10, wherein the cellular voice call quality value comprises a Perceptual Objective Listening Quality Assessment (POLQA) score.

15. The computer-readable medium of claim 10, further comprising instructions which, when executed by the computer, cause the computer to:
select, based on the goodness of fit values, one or more optional KPIs different from the one or more compulsory KPIs, wherein the mathematical relationship for calculating the cellular voice call quality is based on the one or more compulsory KPIs and at least one of the one or more optional KPIs.

16. The computer-readable medium of claim 15, wherein:
the one or more compulsory KPIs have goodness of fit values below a first threshold value; and
the one or more optional KPIs have goodness of fit values exceeding the first threshold value and below a second threshold value.

17. The computer-readable medium of claim 10, wherein:
the instructions to separate the plurality of training data points into the plurality of clusters based on the compulsory KPI values or the cellular voice call quality values comprise instructions which, when executed by the computer, cause the computer to:
separate the plurality of data points into different numbers of clusters, wherein each of the different numbers is greater than or equal to two; and
determine, based on the plurality of training data points, which of the numbers of clusters results in a most accurate module for predicting the cellular voice call quality.

18. The computer-readable medium of claim 11, wherein the plurality of training data points comprise measured data points from a mobile device or an audio sample in a long term evolution (LTE) cellular network.

19. A system comprising:
one or more processors; and
a memory comprising instructions which, when executed by the one or more processors, cause the one or more processors to:
receive a plurality of training data points, wherein each data point in the plurality of training data points includes a cellular voice call quality value and values for at least a subset of a set of key performance indicators (KPIs) related to cellular voice call quality;
determine, for each KPI in the set of KPIs and the using the plurality of training data points, a linear relationship between the KPI and the cellular voice call quality value, wherein each linear relationship is associated with a goodness of fit value;
select, based on the goodness of fit values, one or more compulsory KPIs;
separate the plurality of training data points into a plurality of clusters based on at least one of the compulsory KPI values or the cellular voice call quality values;
determine, for each cluster in the plurality of clusters and using the plurality of training data points in the cluster, a mathematical relationship for calculating the cellular voice call quality within the cluster based on the one or more compulsory KPIs;
generate a module for predicting the cellular voice call quality value by combining the determined mathematical relationships; and
report, based on information generated using the module, that changing one or more of the compulsory KPI values would improve the cellular voice call quality.

20. The system of claim 19, the memory further comprising instructions which, when executed by the one or more processors, cause the one or more processors to:
predict, using the generated module, a new cellular voice call quality value based on input KPIs; and
provide, via the computer, an indication of one or more of the input KPIs to change for improving the predicted cellular voice call quality value in a case where the predicted cellular voice call quality value is insufficient.

* * * * *